United States Patent
Rousseau et al.

(10) Patent No.: US 8,102,875 B2
(45) Date of Patent: Jan. 24, 2012

(54) REMOTE UNIT WITH EXTERIOR CONNECTIVITY, AND CORRESPONDING INFORMATION DELIVERY METHOD

(75) Inventors: Bart Rousseau, Antwerp (BE); Johan Liekens, Holsbeek (BE)

(73) Assignee: Alcatel Lucent, Paris (FR)

( * ) Notice: Subject to any disclaimer, the term of this patent is extended or adjusted under 35 U.S.C. 154(b) by 436 days.

(21) Appl. No.: 11/955,373

(22) Filed: Dec. 12, 2007

(65) Prior Publication Data

US 2008/0144658 A1 Jun. 19, 2008

(30) Foreign Application Priority Data

Dec. 13, 2006 (EP) .................... 06025803

(51) Int. Cl.
*H04L 12/56* (2006.01)

(52) U.S. Cl. ........ 370/466; 370/351; 370/537; 370/468; 705/28

(58) Field of Classification Search .................. 370/537, 370/468, 352; 705/28; 710/315
See application file for complete search history.

(56) References Cited

U.S. PATENT DOCUMENTS

| | | | | |
|---|---|---|---|---|
| 2002/0111883 A1* | 8/2002 | Cerami et al. | .................. | 705/28 |
| 2004/0076144 A1* | 4/2004 | Ishidoshiro | .................. | 370/352 |
| 2004/0146072 A1* | 7/2004 | Farmwald | .................. | 370/537 |
| 2006/0159243 A1 | 7/2006 | Mangione | | |
| 2008/0095188 A1* | 4/2008 | Remy et al. | .................. | 370/468 |

FOREIGN PATENT DOCUMENTS

| | | |
|---|---|---|
| EP | 1 175 078 A2 | 1/2002 |
| FR | 2 780 226 A1 | 12/1999 |

OTHER PUBLICATIONS

Brochure—Alcatel 7300 ASAM—Advanced Services Access Manager (ETSI Version) Release 4.3/4.4—copyrighted 2002.
Brochure—Outdoor Systems—Tecoras Outdoor Cabinet, pp. 2.1-2.28.
Brochure—Alcatel 7300 Asam-c—Compact (ETSI Version)—Release 4.3.

* cited by examiner

*Primary Examiner* — Robert Wilson
*Assistant Examiner* — Mohamed Kamara
(74) *Attorney, Agent, or Firm* — Harness, Dickey & Pierce

(57) ABSTRACT

A remote unit consisting of an enclosure, equipment providing network access, connections to a limited amount of subscribers and a central office which also provides exterior connectivity. Users and information sources in the vicinity of the remote unit can use a wired or wireless interface to the remote unit for content delivery to a central location.

13 Claims, 2 Drawing Sheets

REMOTE UNIT WITH EXTERIOR CONNECTIVITY, AND CORRESPONDING INFORMATION DELIVERY METHOD

FIELD OF THE INVENTION

The current invention generally relates to delivering content to a central location from a remote content source. It provides an alternative to mobile broadcasting stations, such as television satellite trucks, using network infrastructure found in many residential neighborhoods.

BACKGROUND OF THE INVENTION

The use of Digital Subscriber Line (DSL) technology depends heavily on the length and quality of the copper wire between the modem of an end user and the DSL Access Multiplexer (DSLAM). Longer copper wiring reduces the line quality and thus the bandwidth usable on this line. Reducing the length of the copper wire by locating a DSLAM near the end user, typically within a few kilometers, and serving only a small amount of users, for instance 120, will improve the service to the end user significantly.

A DSLAM that is located near the end user is protected from weather conditions by some sort of enclosure, for instance an outdoor cabinet. The DSLAM requires a high bandwidth connection to the Central Office (CO) which could be an office of a telecom operator or internet service provider, and has multiple low bandwidth connections to end users generally used for xDSL access. Other technologies such as Integrated Services Digital Network (ISDN) or Plain Old Telephone Service (POTS) work similarly where a group of end users is connected to an Access Multiplexer (AM), which in turn provides access to the network of an operator.

A Remote Unit (RU) is an enclosure which may be provided with at least one Access Multiplexer, one or more high bandwidth media to a CO and one or more low bandwidth links to end users. Such a Remote Unit is usually located above ground in what is referred to as street cabinet or outdoor enclosure. Alternatively a remote unit can be located underground in what is typically referred to as a manhole.

A remote unit typically has several connections to the central office. Optical fiber provides a reliable high-speed medium which is ideal for carrying multiple information flows simultaneously. Putting fibers in the ground is however an expensive task with major disturbance for the public and traffic. Roads and sidewalks need to be opened before fiber can be placed underneath. Therefore spare fibers are made available in the remote unit for future expansion of the remote unit.

A brochure concerning the Alcatel 7300 ASAM (Advanced Services Access Manager) ETSI version, Release 4.3/4.4 describes the use and advantages of the Alcatel 7300 ASAM in xDSL technology. Particularly the section titled "Extending Network Coverage" on page 6 of the brochure describes how the Alcatel 7300 ASAM can be used as a remote unit to extend geographical coverage of an xDSL deployment. It further describes how such a 7300 ASAM can be connected to products such as a micro DSLAM or a remote Alcatel 7300 ASAM-o as outdoor cabinet. Both the 7300 ASAM and subsequent connected devices such as a micro DSLAM can be considered a remote unit for the current invention. This brochure can be retrieved from the Internet via:
http://www.alcatel.be/doctypes/opgproductbrochure/pdfa4/7300_etsi_bro.pdf.

The datasheet containing specifications of the Alcatel 7300 ASAM-c compact (ETSI version) release 4.3 discloses a DSLAM that can be included in an enclosure to form a remote unit. The Alcatel 7324 Remote Unit is yet another product offering DSLAM technology close to the end user premises. This datasheet can be retrieved from the Internet via:
http://www.alcatel.be/doctypes/opgdatasheet/pdfa4/7300c_etsi_R43_ds.pdf.

All of the above-described products can be included in outdoor cabinets in order to be located near a particular amount of users. These outdoor cabinets provide protection from weather conditions and prevent unwanted physical access to the equipment inside.

Several manufacturers provide enclosures for communication equipment. For instance ICEE Ltd. (Installers of Communication and Electrical Equipment) offers the design and installation of custom-made enclosures. Knürr AG provides a series of outdoor enclosures for various purposes in their Tecoras product line. The CS product line of Rittal is another example of outdoor enclosures that can be used to house communications equipment and be a part in the remote units described in this invention.

Content broadcasters, such as television stations have a need to provide coverage of particular events, for instance music festivals or major news events. This coverage involves acquiring video and audio content, editing this content to an item ready for broadcast and transmitting this item to a central location for broadcast, not necessarily in that order. Typical parts in this process are satellite trucks which provide a satellite uplink to a central location and which are used to transmit the audio and video content. These trucks may also provide an editing studio to prepare the items before they are transmitted. Satellite uplinks are not always reliable; they are prone to delays and interference of radiation in the atmosphere. A typical example of this is the loss of a link during a live interview or the delays that occur between asking a question and a person actually hearing that question.

It is an object of the present invention to provide flexible means for delivering content to a central location from a remote location using existing network infrastructure. It is another object of the present invention to provide encoding and decoding means for easy content delivery. It is a further object of the present invention to facilitate real time audio and video communication between two remote points. It is another objective of the present invention to provide these means for delivering content in a secure way, restricting access from unauthorized persons or devices.

SUMMARY OF THE INVENTION

According to the present invention, the above objectives are realized and the shortcomings of the prior art are overcome through the use of a remote unit for providing network access as described in claim 1, comprising:
  communication means for providing the network access;
  first interface means for connectivity to a central office via at least one uplink; and
  second interface means for connectivity to plural network devices via at least one downlink,
and additionally also comprising third interface means for connectivity to the central office via spare uplink capacity from the exterior vicinity of the remote unit.

These communication means for providing network access can comprise for instance switches, routers or packet processors. Another typical example is a remote unit comprising an Access Multiplexer (AM) which is a device used to multiplex traffic received from multiple downlinks onto a single uplink or to demultiplex traffic received on an uplink for further transmission on the downlinks. Multiplexing is the operation where several different lines are combined and placed onto a single line. In terms of networks, this means for instance combining several low bandwidth links onto a single high bandwidth link. This is an operation that is common in xDSL technology where a Digital Subscriber Line Access Multiplexer (DSLAM) performs it. On the one hand, such a DSLAM is connected to at least one uplink to the central office, which is a high bandwidth link, for example an optic fiber link. On the other hand, the DSLAM is connected to several network devices via respective downlinks. An example of these network devices is an xDSL modem. An xDSL modem is a device that modulates outgoing traffic and demodulates incoming traffic to improve transmission speed between the modem and the DSLAM. Modulation and demodulation is a requirement due to the copper wire which is used to connect such a modem to a DSLAM because this copper wire is limited in bandwidth. These copper wires are the same wires as those used in telephony and therefore such a modem is typically located at the end-user premises. xDSL is only an example of possible technologies using access multiplexing. The Plain Old Telephone System (POTS) also requires some form of communication equipment connecting various telephone lines to a central location. Cable TV is yet another example where a single uplink is connected to various devices via a downlink.

The present invention assumes the presence of additional uplink capacity, for example an additional unlit optic fiber, unused capacity on an uplink or unused wavelengths on a lit fiber. A new interface is added to the remote unit and connected to the spare uplink capacity. This connection can be made directly, from the interface to a spare optic fiber or pass through for example the DSLAM to use additional capacity of that uplink. This interface offers access to the spare uplink capacity and provides high bandwidth connectivity to the central office and is accessible to devices in the vicinity of the remote unit, without the need to open the remote unit.

Deployment of remote units to provide Internet access, telephony or video delivery increases rapidly in order to serve the constantly growing number of end users. Therefore, content recorders, such as cameras or recording equipment used by journalists or reporters are likely to be in the vicinity of at least one remote unit. By enabling them to use the spare uplink capacity, they can easily deliver their recorded material to the central office without the need for satellite transceivers or additional staff at the location of the recording. This consequentially reduces the amount of equipment required to cover a particular event. The recorded material may be forwarded from the central office to a broadcasting agency or the material may be distributed to the general public. Mobile satellite transmission systems, such as satellite trucks are no longer required because the present invention only requires means for collecting the content from the sources and transmitting them to the third interface of the remote unit. Such means may consist of a portable computer and a wired or wireless connection to the third interface. An alternative implementation of these means can be a dedicated device which has a link to the third interface and various content sources. As a result, there is less parking space required for satellite trucks or vehicles providing other services such as on the scene video editing which reduces the disturbance in a particular neighborhood.

An optional feature of the present invention is the use of a wired interface as part of the third interface providing access to the spare uplink from the exterior vicinity of the remote unit as described in claim 2.

Such an interface allows a content source to be physically connected to the remote unit from within the vicinity of the remote unit. The wired interface is connected to the spare uplink capacity, and may comprise one or more intermediate devices. When placing this interface on the outside of the remote unit, access to the spare uplink capacity does not require the opening of the enclosure of the remote unit exposing the equipment housed therein. Keeping the enclosure closed at all times can be beneficial to the equipment contained therein. For instance, bad weather conditions may damage the equipment when it is exposed to these conditions by opening the enclosure. Such an external wired interface may be covered by a lid on the outside of the enclosure. This lid protects the connector from weather conditions in a similar fashion as the enclosure protects the housed equipment. Opening this lid in order to connect equipment to the wired interface should not be considered opening the enclosure.

The wired interface may be an RJ-45 interface, an optical interface, an IEEE1394 (Firewire) interface, a Universal Serial Bus (USB) interface, an ASI (Asynchronous Serial Interface) interface or an SDI (serial digital interface) interface as indicated by claim 3.

These interfaces typically provide high bandwidth connections that are essential in streaming content to the central office. An RJ-45 interface could support Ethernet, Fast Ethernet or even Gigabit Ethernet over a twisted pair copper wire. Optical interfaces could be directly connected to the spare uplink and thus form a direct connection to the central office without requiring any additional hardware. Firewire (IEEE 1394) or USB are often used in devices with large amounts of storage such as external hard discs. Such an interface may be used to read directly from such a storage device with support of an additional device between the interface and the spare uplink. As research continues it, it is not unlikely that these technologies may evolve over time. There has been an evolution from FireWire 400 to FireWire 800 and from USB 1.0 to 1.1 and to USB 2.0. Therefore future evolutions or even new technologies in the field of wired interfaces should be considered as part of this invention although they are not explicitly referred to here.

A further optional feature of the present invention is that the third interface means may comprise a wireless interface to the exterior vicinity of the remote unit, as is described in claim 4.

Such a wireless interface can be completely integrated into the remote unit, therefore not requiring any openings in the enclosure of the remote unit. This may be beneficial for locations with extreme weather conditions where the enclosure provides a protection against leakage and keeps the remote unit under certain temperature conditions. Of course, an external antenna may be used as well or even a connector for a powerful exterior antenna can be present. Such a connector could be used to extend the range wherein information sources are located somewhat to cover for instance a larger terrain. A wireless interface also reduces the chances for damage due to violence or vandalism. A wireless interface further improves mobility for the content sources such as camera's or alternate recording equipment. These can easily be moved to another location within range of the wireless interface and continue their communication during and after the movement.

Optionally, the wireless interface may be a WiFi interface, a WiMax interface, a Bluetooth interface or an Infrared interface as indicated by claim 5.

Infrared interfaces require direct line of sight in order to work and have lower bandwidth but can be used for small volumes of content that are not under any time constraints.

Bluetooth offers more bandwidth and is relieved from a direct line of sight requirement. WiFi or WiMax offer sufficient bandwidth for large volumes to be transferred at appropriate speed and should be the preferred for any embodiment which is expected to see substantial amounts of traffic. Obviously, numerous variant wireless interfaces exist which may serve the purpose of the present invention. For instance, it may be possible to create a new transmission protocol which uses a frequency that is currently available for radio transmission in order to communicate with the remote unit.

A further optional feature of the present invention is that the third interface means may comprise means for encoding or decoding signals, as described in claim 6.

To increase the reliability of transmitted signals, certain encoding techniques may be used on uplinks to the central office, either the uplink from the access multiplexer or a spare uplink. Such encoding facilitates error detection or correction or increases the speeds at which information can be transmitted on a particular link. It may be possible to offer an encoding and decoding mechanism on the third interface which adapts traffic to the transmission protocols used on the uplink used to transmit the information to the central office.

Data transmission is typically a two-way system and therefore decoding may need support in the remote unit. Because transmission may fail at some point, it should be possible for the central office to request retransmission or inform the remote unit that information was received correctly. If any encoding techniques are used when transmitting information on an uplink, the remote unit may need to support a decoding technique to process such retransmission requests or information messages.

A further optional feature of the present invention is the presence of means for the restriction of access to the spare uplink capacity, as described in claim 7.

The use of the third interface and the spare uplink capacity may be restricted to a particular set of users. It may be unacceptable for the broadcasting agencies that the general public has access to the third interface. Unauthorized access to the upstream bandwidth or malicious intent to access the central office may be prevented with a form of access restriction. It may also be desirable to identify the users of the spare uplink capacity in order to generate billing information for the use of uplink capacity.

Such access restriction may be provided by a physical lock on a wired interface, a restriction based on some sort of hardware address of a content source (such as a MAC address for Ethernet interfaces) or the use of some login and password mechanism before one is able to transmit information to the third interface. The access restriction functionality may be implemented in the device offering encoding and decoding or may be realized in separate hardware or software.

A further optional feature of the present invention is the possibility of a link between the third interface means and the communication means in the remote unit as described in claim 8.

Such a link between the third interface and the communication equipment could be used for instance to deliver content to a small group of end users connected to the remote unit. This may be useful for testing purposes or to display neighborhood information to the subscribers of that neighborhood without the need to transmit the information to the central office. The link could also be used to deliver content to the central office using the first interface uplink or unused capacity on the first interface uplink, for instance to balance the load of traffic between several uplinks or in case the spare uplink fails or in case no additional uplinks are available in the remote unit. It may also be possible to provide access to the communication equipment from the exterior of the remote unit through the third interface, for example for configuration and monitoring of the communication equipment.

In an instance of the present invention, the communication means include a Digital Subscriber Line Access Multiplexer, as described in claim 9.

xDSL is a typical technology where remote units are extensively used. Delivery of high definition video content requires high bandwidths to the end user. Reducing the length of copper wire between a DSLAM and the end user equipment can increase the available bandwidth. Therefore remote units with DSLAM technology are common in areas where xDSL is available. The use of remote units according to the present invention allows the use of spare uplink capacity to deliver content to a central office with the above-described advantages.

Optionally, the second interface providing access through at least one downlink may be adapted to provide connectivity for up to 120, users as described in claim 10.

The access multiplexer has to merge all downlinks and the traffic flowing thereon onto a single or a few uplinks. Although these uplinks have higher bandwidth, they are still limited in capacity. When a large number of users is connected to a single access multiplexer, each user has a chance at lower speeds for their connection. In order to provide full speed access, the communication equipment is limited to an amount of users which does not introduce a degrading of the access.

The current invention further relates to a remote unit as defined in claim 11, comprising:
  a Digital Subscriber Line Access Multiplexer;
  a first interface for providing an uplink to a DSL Central Office via optical fiber;
  a second interface for providing connectivity to end user equipment via copper cables; and
a third interface for providing connectivity to the DSL Central Office via spare uplink capacity for registration means and which is available from the outside vicinity of the remote unit.

In addition, the current invention relates to a corresponding method for delivering digital information using a remote unit as defined by claim 12. This method comprises:
  registering digital information;
  transmitting the digital information to the remote unit;
  transmitting the digital information from the remote unit to a central office; and
wherein transmitting the information to the remote unit involves connecting with a third interface available from the exterior vicinity of the remote unit, and transmitting the digital information to the central office involves using spare uplink capacity.

The first step involves recording information such as audio or video using a registration device such as a digital video camera. Once the information is gathered, it is delivered to the remote unit using the third interface thereon. The remote unit then uses spare uplink capacity, useable through the third interface to transmit the digital information to a central office.

Information is delivered to the device from the exterior vicinity of the remote unit. The exterior vicinity may only cover a few meters when a wired third interface is used, or up to a few hundred meters when using a wireless interface such as WiFi or WiMax.

The spare link may be an optical fiber which was not used before but is available in the remote unit, unused capacity of an uplink currently in use or unused wavelengths on a lit fiber. This spare uplink capacity may be reachable directly through the third interface or through an intermediate device providing for instance encoding, decoding and authentication.

DETAILED DESCRIPTION OF EMBODIMENTS

Figure 1:
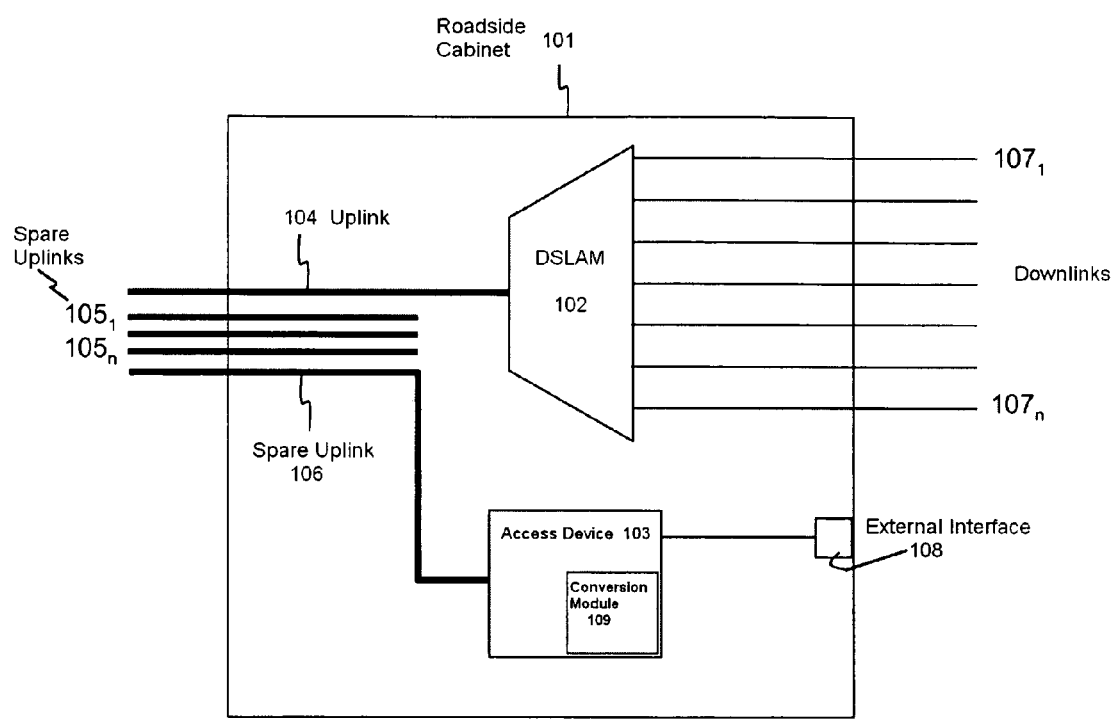
FIG. 1 illustrates a first embodiment of the remote unit according to the present invention, containing a DSLAM and a wired interface to the exterior vicinity of the cabinet.

FIG. 1 illustrates a roadside cabinet 101 deployed in areas where Internet access is provided through xDSL technology. The cabinet 101 houses various pieces of equipment such as a DSLAM 102 and a device 103 to provide access to the cabinet. The cabinet further contains multiple high bandwidth connections such as an uplink 104 from the DSLAM 102 to the Central Office (CO), not drawn in FIG. 1, and various spare uplinks such as $105_1$ to $105_n$ and 106. Multiple downlinks, typically of lower bandwidth extend from the cabinet 101 to the customer premises, for instance downlinks $107_1$ to $107_n$.

The device 103 is connected to the spare uplink 106 and to an external interface 108. This external interface 108 provides a wired access to the device 103, for instance through an RJ-45 connector, a Universal Serial Bus (USB) connector, an ASI (Asynchronous Serial Interface) interface, an SDI (serial digital interface) interface, a FireWire (IEEE1394) connector or a connector for an optic fiber connection. This connector 108 enables access to the cabinet 101 from within the near vicinity, without the need for opening the cabinet 101. Additionally, modules can be added to device 103, for instance module 109 features conversion of the digital information into a transmittable form.

Different encodings can be used to transmit information on the uplink 106 and this typically depends on the communication protocols used on this uplink 106. Channel encodings used in ATM or Ethernet are different, the used error correction or detection algorithm varies between specific protocols and the necessary code transformations can be resolved by device 103 by adding appropriate software to the device. This software can be a firmware providing basic support for all the functionality or can be a small operating system including a web server which offers an easy to use web-based interface to the user for the delivery of content to the CO.

Figure 2:
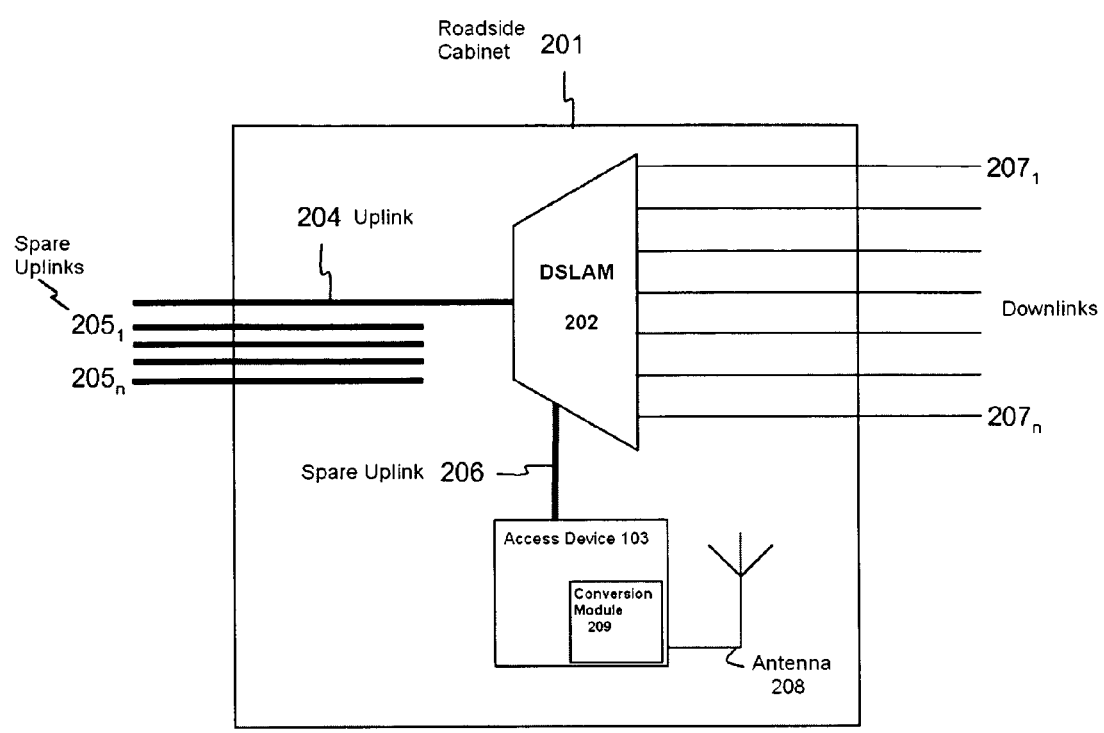
FIG. 2 illustrates a second embodiment of the remote unit according to the present invention, containing a DSLAM and a wireless interface to the exterior vicinity of the cabinet.

FIG. 2 illustrates another road side cabinet 201 housing a DSLAM 202, a device 203 for providing access to spare uplink capacity, an uplink 204 connecting the DSLAM 202 to the CO, additional spare uplinks $205_1$ to $205_n$, and a set of downlinks $207_1$ to $207_n$ providing access to end-user devices. In this embodiment of the present invention, the spare uplink capacity is an unused wavelength in uplink 204. Device 203 is connected to the DSLAM 202 by link 206 in order to be able to transmit information on this wavelength. DSLAM 202 supports adding extra traffic to it's uplink 204 from a source which is not a downlink $207_1$ to $207_n$.

In this particular embodiment of the present invention, device 203 also comprises module 209 to offer access restriction through the use of passwords, a signature, filtering at a hardware level (e.g. MAC address filtering when Ethernet is used), or a combination thereof. This access restriction is useful to protect the device 203 and the spare uplink capacity from malicious users. It also allows the identification of the person using the spare uplink capacity which may be used for billing.

A journalist or a content source such as a digital camera records video and stores this information in digital form. Then, the digital information is transmitted to the cabinet 201 using a wireless connection such as WiFi, WiMax or Bluetooth. An antenna 208 is present to receive these wireless signals and to convey the digital information to device 203. The latter device 203 will perform authentication with module 209 before transmitting the digital information onto link 206 to DSLAM 202 and from there to the CO over uplink 204.

The above embodiments show a distinction between a wired and wireless interface. It should be noted that the present invention is not limited to these two separate cases, it is possible to provide both interfaces simultaneously. In addition it is also possible to incorporate access restriction and encoding or decoding logic into a single device. The use of either functionalities does not exclude the presence or use of additional functionalities such as the capability to prioritize traffic.

It should also be noticed that the remote units are not limited to a single DSLAM. Multiple DSLAMs can be present in a single enclosure and one or more of these DSLAMs may be used in combination with the present invention. It is also important to realize that a DSLAM is used as an example here. Generally any type if multiplexer or device with similar functionality can be present in the remote unit, for instance an Optical Network Terminal (ONT) used to deliver fiber to the home, a Cable Modem Termination System (CMTS) which connects a series of cable modems to the central office, or a Digital Loop Carrier (DLC).

The essential point is the location of the access multiplexers in the neighborhood of the customers. This neighborhood is from a few meters up to a few hundred meters. This reduces the downlink distance between the access multiplexers and the customers for better performance. A DSLAM used for such a purpose is often called a mini DSLAM or a neighboring unit. This makes the distinction from a DSLAM located at the CO which serves a larger amount of users. Such a DSLAM at a CO may be connected to numerous mini DSLAMs each connected to a small amount of subscribers, for instance up to 120. Therefore a CO DSLAM serves up to several hundreds of users.

The vicinity of the remote units depends on the type of connection used. When using a wired connection, the vicinity is relatively close to the remote unit, a few meters at most. Wireless connections have a larger range and can go up to a few hundred meters. The vicinity of the remote unit should be considered any place from where a descent connection to the remote unit can be established. The vicinity generally allows physical access to the remote unit.

The figures show a limited amount of uplinks and downlinks from 1 to n, it should be noted that it is perfectly possible to have more or less links than shown in the figures. For instance, there may be only a single uplink to the CO which implies the use of a connection between the access multiplexer and the external interfaces with or without intermediate devices. It may also be possible to have both a dedicated uplink for the external interface and a connection to the access multiplexer. This may be used to cover short periods of high load on either of those links.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", "third", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:

1. A remote unit (101; 201) for providing network access comprising:
    a first interface configured to provide connectivity to a central office via a first link, the first link including a plurality of uplinks;
    a second interface configured to provide connectivity to plural network devices via a second link;
    a first access unit configured to selectively interconnect said first interface and said second interface and provide said network access to said plurality of network devices via a first subset of the plurality of uplinks;
    a third interface configured to provide connectivity to another device; and
    a second access unit configured to selectively interconnect said first interface and said third interface and provide said network access to said another device via spare link capacity of said first link, the spare link capacity being associated with a second subset of the plurality of uplinks, the first subset of uplinks and the second subset of uplinks being different uplinks.

2. The remote unit as described in claim 1, wherein said third interface includes a wired interface to the exterior vicinity of said remote unit.

3. The remote unit as described in claim 2, wherein said wired interface is one of an RJ-45 interface, an optical interface, an IEEE 1394 interface, a Universal Serial Bus interface, an ASI (Asynchronous Serial Interface) interface and an SDI (serial digital interface) interface.

4. The remote unit as described in claim 1, wherein said third interface includes a wireless interface to the exterior vicinity of said remote unit.

5. The remote unit as described in claim 4, wherein said wireless interface is one of a WiFi interface, a WiMax interface, a Bluetooth interface and an Infrared interface.

6. The remote unit as described in claim 1, wherein said third interface is further configured to encode and decode signals.

7. The remote unit as described in claim 1, wherein said third interface is configured to restrict access to said spare uplink capacity.

8. The remote unit as described in claim 1, further comprising a Digital Subscriber Line Access Multiplexer (DSLAM).

9. The remote unit as described in claim 1, wherein said second interface is configured to connect to at most 120 end users.

10. A remote unit for providing network access comprising:
    a first interface configured to provide an uplink to a DSL Central Office via optical fiber, the uplink including a plurality of uplinks; and
    a second interface configured to provide connectivity to end user equipment via copper cables
    a first access unit configured to selectively interconnect said first interface and said second interface and provide said network access to said end user equipment via a first subset of the plurality of uplinks;
    a third interface configured to provide connectivity to a device
    a second access unit configured to selectively interconnect said first interface and said third interface and provide said network access to said device via spare uplink capacity, the spare uplink capacity being associated with a second subset of the plurality of uplinks, the first subset of uplinks and the second subset of uplinks being different uplinks.

11. A method for delivering digital information using a remote unit, said remote unit including a first interface to provide connectivity to a central office via a plurality of uplinks, said remote unit including a second interface to provide connectivity to a plurality of network devices, and said remote unit including a first access unit configured to selectively interconnect said first interface and said second interface and provide said network access to said plurality of network devices via a first subset of the plurality of uplinks, said method comprising:
    registering digital information;
    transmitting said digital information to said remote unit; and
    transmitting said digital information from said remote unit to the central office, wherein
    transmitting said digital information to said central office involves connecting with a third interface configured to provide connectivity to another device and transmitting said digital information to said central office involves using a second access unit configured to selectively interconnect said first interface and said third interface and provide said network access to said another device via spare link capacity of a first link associated with said first interface, the first link includes the plurality of uplinks, the spare link capacity being associated with a second subset of the plurality of uplinks, the first subset of uplinks and the second subset of uplinks being different uplinks.

12. The remote unit as described in claim 1, wherein
    the first link is one of a plurality of links, and
    the second access unit is further configured to one of (1) provide said network access via excess capacity of the first link and (2) provide said network access via a second link of said plurality of links.

13. The remote unit as described in claim 10, wherein
    the optical fiber is one of a plurality of optical fibers, and
    the second access unit is further configured to one of (1) provide said network access via excess capacity of the optical fiber and (2) provide said network access via a second optical fiber of said plurality of optical fibers.

* * * * *